United States Patent [19]

Snyder

[11] Patent Number: 4,577,912
[45] Date of Patent: Mar. 25, 1986

[54] SELF-ALIGNING LOAD TRANSMISSION POST

[75] Inventor: Robert F. Snyder, Hamden, Conn.

[73] Assignee: Raymond Engineering Inc., Middletown, Conn.

[21] Appl. No.: 604,171

[22] Filed: Apr. 26, 1984

[51] Int. Cl.[4] .............................................. F16C 11/00
[52] U.S. Cl. .................................... 308/2 R; 411/537
[58] Field of Search ............. 411/537, 538, 383, 396; 308/2 R; 248/188.4, 188.9; 269/309, 60; 16/224, 245, 246, 238, 18 A, 18 R, 42 T; 267/122

[56] References Cited

U.S. PATENT DOCUMENTS

| | | | |
|---|---|---|---|
| 1,954,458 | 4/1934 | North | 16/42 T |
| 2,404,274 | 7/1946 | Christie | 269/309 |
| 3,666,290 | 5/1972 | Dalton | 16/42 T X |
| 3,683,686 | 8/1972 | Sergan | 73/862.21 |
| 4,012,084 | 3/1977 | Ranheim | 267/122 X |

FOREIGN PATENT DOCUMENTS

T8917 6/1956 Fed. Rep. of Germany ... 248/188.9

Primary Examiner—Kenneth J. Dorner
Assistant Examiner—Adrian H. Whitcomb, Jr.
Attorney, Agent, or Firm—Fishman & Dionne

[57] ABSTRACT

A self-aligning post is presented to direct and/or balance a load being transmitted. The post has a semispherical end section split from the remaining main cylindrical portion of the post whereby misalignment of the main cylindrical portion is compensated by the split end section. The post is further provided with means for retaining the cylindrical portion in contact with the semispherical end section and for preventing the split end section from slipping from a socket. Preferably, the retaining means is an annular skirt disposed along the flat perimeter of the semispherical end section wherein the cylindrical portion of the post will bear against the skirt during misalignment and thereby prevent slippage.

8 Claims, 6 Drawing Figures

SELF-ALIGNING LOAD TRANSMISSION POST

BACKGROUND OF THE INVENTION

This invention relates to the field of load transmission devices. More particularly, this invention relates to a self-aligning load transmission post for use with a plurality of bellows or other devices in an environment where there are critical requirements for the direction and location in which a load is imposed.

This invention is particularly intended to be an improvement in the construction of the self-aligning load transmission post disclosed in U.S. Pat. No. 4,012,084, which is assigned to the assignee hereof and incorporated herein by reference. U.S. Pat. No. 4,012,084 was intended, in part, to be an improvement over the construction of the mechanical torque wrench with hydraulic readout described in U.S. Pat. No. 3,683,686, which is assigned to the assignee of the present invention and incorporated herein by reference. Reference is hereby made to U.S. Pat. Nos. 4,012,084 and 3,683,686 for a full understanding of the environment and details thereof in which the preferred embodiment of this invention will be described.

The torque wrench of U.S. Pat. No. 3,683,686 has a hydraulic readout system to obtain meaurements of the torque being applied. That hydraulic readout system employs two hydraulic load cells, in the form of bellows, and a Bourdon gauge interconnected by hydraulic tubing, those elements being hermetically sealed and filled with a non-compressible fluid. As torque is applied with the wrench, reaction forces equal to output torque of the wrench are imposed on the bellows and measured on the Bourdon gauge to provide an accurate measurement of the torque output of the wrench.

Each bellow is mounted between a pair of opposed posts, and the reaction forces are applied to the bellows through these posts. Equalization of the loads on the bellows is critical for accurate readout of the torque load; and experience has shown that very close tolerances must be maintained on the alignment of the posts with each other and with the center line of the bellows to achieve this load equalization and accuracy in readout. While these tolerances can be realized, they increase the time and cost of manufacturing the wrench; and it has become highly desirable to find other ways of obtaining the desired load equalization.

U.S. Pat. No. 4,012,084 provides an improved post structure to the torque wrench of U.S. Pat. No. 3,683,686. In U.S. Pat. No. 4,012,084, self-aligning posts are provided which insure that the reaction loads will always be delivered through the center of the bellows and along the axis of the bellows. This assures equalization of the load on each of the bellows and accuracy of readout, notwithstanding gross misalignment between the center line of the posts with each other or with the axis of the bellows. The self-aligning posts of U.S. Pat. No. 4,012,084 are achieved by forming each of the posts in two separate parts. One part is a solid semispherical tip which engages a corresponding concave depression of larger radius in the bellows; and the other part is a main cylindricalsection which has a flat end to engage and bear against the flat portions of the semispherical tip. The bellows is retained between opposed self-aligning posts. This split configuration of the posts assures that the reaction forces of the wrench are delivered through the center of the bellows and along the bellows axis regardless of misalignment between the posts with each other or with the axis of the bellows.

While suitable for its intended purpose, the two separate parts of the self-aligning posts disclosed in U.S. Pat. No. 4,012,084 have a tendency to slip and disengage. In case of severe misalignment, the flat end of the semispherical tip may slip out of engagement with the flat end of the cylindrical post and may slip out of the socket in which the tip is located in the bellows. Any such slippage or disengagement is, of course, undesirable and presents adverse consequences.

SUMMARY OF THE INVENTION

The above discussed and other problems of the prior art areovercome or alleviated by the self-aligning posts of the present invention. In accordance with the present invention, the self-aligning posts are formed by two separate pieces, one piece being a solid semispherical tip having an annular retaining skirt portion and the other being a main cylindrical section which has a flat end to engage and bear against the flat portions of the semispherical tip within the annular skirt.

The self-aligning posts of the present invention are therefore improved over the posts described in U.S. Pat. No. 4,012,084 by the presence of the annular skirt on the solid semispherical tip. Thus, particularly in cases of severemisalignment, the cylindrical section will bear against the sides of the skirt. Accordingly, the annular skirt will act to prevent slippage between the cylindrical section and the tip and will prevent the tips from slipping out of its bellows socket.

The above-discussed and other advantages of the present invention will be apparent to and understood by those skilled in the art from the following detailed description and drawings.

BRIEF DESCRIPTION OF THE DRAWINGS

Referring now to the drawings, wherein like elements are alike in the several FIGURES.

DESCRIPTION OF THE PREFERRED EMBODIMENT

Figure 1:
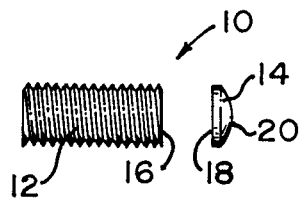
FIG. 1 is an exploded elevation view of a self-aligning post in accordance with the prior art.

Reference should initially be had to U.S. Pat. Nos. 3,683,686 and 4,012,084 for all of the details of construction and operation of the torque wrench therein. FIG. 1 (4,012,084) and FIG. 7 (3,683,686) are particularly significant as those FIGURES and the descriptions thereof set forth in the specifications of those patents define the environment for which the present invention is intended.

Referring to FIG. 1, the self-aligning post of prior art U.S. Pat. No. 4,012,084 is shown generally at 10. This post has a main cylindrical body portion 12 externally threaded to engage the wrench housing (not shown) and separate tip 14 which is a solid semispherical shape or other segment of the sphere. Body portion 12 has a flat end 16 perpendicular to the axis of the body portion, and tip 14 has a flat surface 18 perpendicular to its axis of rotation. An important feature is that the radius of curvature of the spherical shaped surface 20 of tip 14 is less than the radius of curvature of the associated depression or socket (e.g. 26 in FIG. 2) in the end of the bellows, the difference being on the order of 0.015 inches. This difference is very important to the proper functioning of this prior art post because it assures the load is always delivered to the bellows along the bellows center line.

Figure 2:
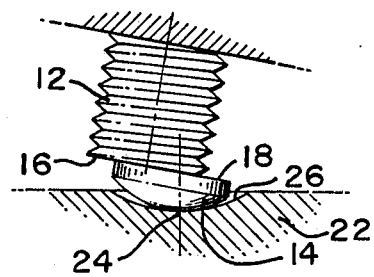
FIG. 2 is a view showing the FIG. 1 self-aligning post of the prior art misaligned with respect to the bellows.

Referring to FIG. 2, a configuration of the prior art is shown wherein body 12 (and its axis) is misaligned both angularly and laterally with respect to the axis of bellows 22. The contact between flat surface 16 and 18 remains flush where they overlap, and thus the axis of revolution of tip 14 is also angularly offset with respect to the axis of bellows 22, the force imposed through cylindrical body 12 is still delivered along the axis of bellows22. This is so because there is still only a single point of contact 24 with the surface of recess 26 and the contact at that point is being made with a cylindrical surface whereby the force is in a radial direction in tip 14 at the point of contact. It is to be noted that tip 14 has rotated with respect to recess 26 whereby a different point on the exterior of tip 14 is in contact with the single contact point. However, the force imposed on bellows 22 remains along the bellows axis because the single point 24 of contact between the spherical surface of tip 14 and the bellows is at the bellows center line and the force is in a radial direction at tip 14.

As previously mentioned, while the prior art self-aligning post 10 of FIGS. 1 and 2 is suitable for its intended purpose, the two parts of the post 10 may, in cases of severe misalignment, slip apart and disengage the tip 14 from bellows socket 27. The adverse effects of such slippage are highly undesirable as they necessitate added costs and labor in repair and downtime of the hydraulic wrench.

Figure 5:
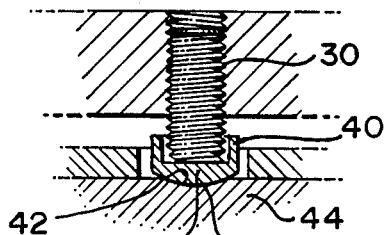
FIG. 5 is an elevation view, partly in cross section, showing the self-aligning post of the present invention in an aligned state with respect to the bellows.
Figure 3:
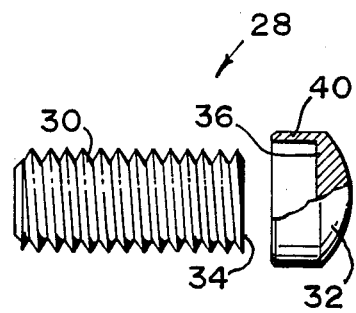
FIG. 3 is a exploded elevation view, partly in cross section, of a self-aligning post in accordance with the present invention.
Figure 6:
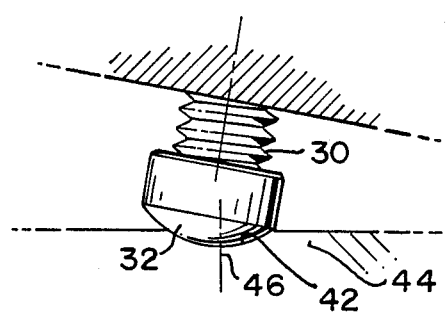
FIG. 6 is an elevation view, partly in cross section, showing the self-aligning post of the present invention misaligned with respect to the bellows.

The novel self-aligning posts of the present invention shown generally at 28 in FIG. 3 overcomes the above discussed disadvantages of the prior art. In FIG. 3, post 28 has a main cylindrical body portion 30, externally threaded to engage a wrench housing (a portion of which is shown in FIGS. 5 and 6), and a separate tip 32 which is a solid semispherical shape or other segment of a sphere. Body portion 30 has a flat end 34 perpendicular to the axis of the body portion 30 while tip 32 has a flat surface 36 perpendicular to its axis of rotation.

Figure 4:
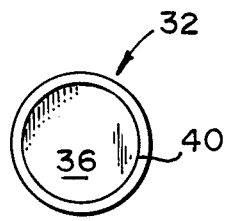
FIG. 4 is an end view of a portion of the self-aligning post of FIG. 3.

An important feature of the present invention is the means provided for preventing slippage between the flat end 34 of the body portion 30 and the flat surface 36 of tip 32 (i.e., retaining flat end 34 in contact with flat surface 36). In a preferred embodiment, this retaining means is an annular skirt 40 extending from the perimeter of flat surface 36 (see FIG. 4). The diameter of body section 30 is about 20% less than the inner diameter of skirt 40 (i.e. the outer thread diameter of body section 30 is about 80% of the inner diameter of skirt 40). In the case of severe misalignment between body section 30 and tip 32, contact occurs between the inner annular surface of skirt 40 and body section 30. Once this contact is established, tip 32 is restrained and can not slip out of socket 26.

FIG. 5 shows a situation where the axis of post 28 is aligned with the axis of a bellows, i.e., there is neither a lateral nor angular offset. This is the idealized situation. Tip 32 is centered in recess 42, with a single point of contact being made between tip 32 and bellows 44 at contact point 46 in the surface of recess 42 along the axis of the bellows. The reaction forces from the casing are delivered directly along the bellows axis through their single point of contact.

Referring now to FIG. 6, a configuration of the present invention is shown wherein body portion 30 is misaligned both angularly and laterally with respect to the axis of bellows 44. However, unlike the prior art self-aligning post disclosed in U.S. Pat No. 4,012,084 which was susceptible to slippage and disengagement as heretofore discussed, the contact between the inner surface of annular skirt 40 of tip 32 and body portion 38 prevents slippage.

The foregoing discussion of FIGS. 3–6 has only referred to a single body 30 and tip 32 on one side of the bellows. That single post arrangement can, of course, be sufficient for any embodiment in which it is desired to deliver a load to only one side of bellows or other device. For the torque wrench configuration of U.S. Pat. Nos. 3,683,686 and 4,012,084, however, it will be understood that there will also be another post comprised of body 30 and tip 32 engaging the opposite recess 42. Recess 42 will also be of larger diameter than the tip which engages it, the size relationship being the same as that discussed above for tip 32 and recess 42, and all of the analysis presented above for lateral and angular offsets would also apply to this side of the bellows.

From the foregoing, it can be seen that the present invention provides a self-aligning post in which the separated tip 32 remains in its bellows socket 27 no matter how great the misalignment encountered in the system.

Furthermore, the present invention achieves its objective without sacrificing the advantages of the torque wrench disclosed in U.S. Pat. Nos. 3,683,686 and 4,012,084.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A self-aligning post for transmitting a load to a bellows including:

a cylindrical body portion having a planar end surface substantially perpendicular to the axis of said cylindrical body portion;

a semispherical tip, said tip having a flat surface perpendicular to the central axis of said tip and in contact with said planar surface of said cylindrical body portion, said tip also having a spherical shaped surface for engagement with a concave receptacle of the bellows, the radius of curvature of said spherical surface being less than the radius of the concave receptacle, whereby said spherical shaped surface of said tip is always in contact with the same part of the concave receptacle of the bellows when imposing a load, regardless of the alignment of said cylindrical body portion with respect to the bellows; and means for retaining said cylindrical body portion in contact with said semispherical tip, said retaining means comprising an annular skirt disposed along the perimeter of said flat surface of said tip, and wherein said cylindrical body portion is removably disposed within said annular skirt.

2. The self-aligning post of claim 1 wherein:
the diameter of said cylindrical body portion is about 20% less than the inner diameter of said annular skirt.

3. The self-aligning post of claim 1 wherein:
the central axis of said tip and the axis of said cylindrical portion are parallel at all times when transmitting a load.

4. The self-aligning post of claim 1 wherein:
the bellows has an axis, and the load to the bellows is always transmitted to the bellows along the axis thereof.

5. A self-aligning post for transmitting a load to a device to be loaded, including a cylindrical bodyportion having a planar end surface substantially perpendicular to the axis of said cylindrical body portion; and
a semispherical tip, said tip having a flat surface perpendicular to the central axis of said tip and in contact with said planar surface of said cylindrical body portion, said tip also having a spherical shaped surface for engagement with a concave receptacle of the device to be loaded, the radius of curvature of said spherical surface being less than the radius of the concave receptacle, whereby said spherical shaped surface of said tip is always in contact with the same part of the concave receptacle of the device to be loaded when imposing a load, regardles of the alignment of said cylindrical body portion with respect to the device to be loaded; and
means for retaining said cylindrical body portion in contact with said semispherical tip, said retaining means comprising an annular skirt disposed along the perimeter of said flat surface of said tip, and wherein said cylindrical body portion is removably disposed within said annular skirt.

6. The self-aligning post of claim 5 wherein:
the diameter of said cylindrical body portion is about 20% less than the inner diameter of said annular skirt.

7. The self-aligning post of claim 5 wherein:
the central axis of said tip and the axis of said cylindrical portion are parallel at all times when transmitting a load.

8. The self-aligning post of claim 5 wherein:
the load to the device to be loaded is always transmitted in one predetermined direction by said tip.

* * * * *